United States Patent
Lee et al.

(10) Patent No.: US 12,009,530 B2
(45) Date of Patent: Jun. 11, 2024

(54) POUCH TYPE BATTERY CELL AND METHOD FOR MANUFACTURING THE SAME

(71) Applicant: LG Energy Solution, Ltd., Seoul (KR)

(72) Inventors: Chang Je Lee, Daejeon (KR); In Seok Lee, Daejeon (KR); Gi Hoon Myoung, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 0 days.

(21) Appl. No.: 18/221,102

(22) Filed: Jul. 12, 2023

(65) Prior Publication Data

US 2024/0021927 A1    Jan. 18, 2024

(30) Foreign Application Priority Data

Jul. 15, 2022 (KR) .......... 10-2022-0087829

(51) Int. Cl.
| | |
|---|---|
| *H01M 50/105* | (2021.01) |
| *B23K 26/244* | (2014.01) |
| *B23K 101/36* | (2006.01) |
| *H01M 10/04* | (2006.01) |
| *H01M 50/119* | (2021.01) |
| *H01M 50/121* | (2021.01) |

(Continued)

(52) U.S. Cl.
CPC ......... *H01M 50/105* (2021.01); *B23K 26/244* (2015.10); *H01M 10/049* (2013.01); *H01M 50/119* (2021.01); *H01M 50/121* (2021.01); *H01M 50/129* (2021.01); *H01M 50/136* (2021.01); *B23K 2101/36* (2018.08)

(58) Field of Classification Search
CPC ............ H01M 50/105; H01M 10/049; H01M 50/119; H01M 50/121; H01M 50/129; H01M 50/136; B23K 26/244; B23K 2101/36

See application file for complete search history.

(56) References Cited

U.S. PATENT DOCUMENTS

| | | |
|---|---|---|
| 2004/0166406 A1 | 8/2004 | Higuchi et al. |
| 2010/0003594 A1 | 1/2010 | Hong et al. |
| 2015/0030912 A1 | 1/2015 | Nose et al. |

(Continued)

FOREIGN PATENT DOCUMENTS

| | | |
|---|---|---|
| JP | 3070035 U | 7/2000 |
| JP | 2000223090 A | 8/2000 |

(Continued)

*Primary Examiner* — Helen Oi K Conley
(74) *Attorney, Agent, or Firm* — Lerner David LLP

(57) ABSTRACT

A pouch type battery cell according to an embodiment of the present invention may include an electrode assembly accommodated between a pair of cases, each of which include a first resin layer constituting an innermost layer, a second resin layer constituting an outermost layer, and a metal layer stacked between the first and second resin layers. The pouch type battery cell may include a cup portion, accommodating the electrode assembly, an insulation sealing portion, in which the first resin layers of the pair of cases are sealed to each other, a folded portion, in which an edge of one case of the pair of cases is folded to surround an edge of the other case, and a metal sealing portion, provided on the folded portion, in which the metal layers of the pair of cases are sealed to each other.

18 Claims, 6 Drawing Sheets

(51) Int. Cl.
*H01M 50/129* (2021.01)
*H01M 50/136* (2021.01)

(56) References Cited

U.S. PATENT DOCUMENTS

| | | | |
|---|---|---|---|
| 2015/0118543 A1* | 4/2015 | Kim .................... | H01M 50/121 429/186 |
| 2019/0379012 A1 | 12/2019 | Mizuguchi | |
| 2021/0043886 A1 | 2/2021 | Oshima et al. | |

FOREIGN PATENT DOCUMENTS

| | | | | |
|---|---|---|---|---|
| JP | 2004055154 A | 2/2004 | | |
| JP | 2004095217 A | 3/2004 | | |
| JP | 2005045180 A | 2/2005 | | |
| JP | 2009224147 A | 10/2009 | | |
| KR | 20040048295 A | 6/2004 | | |
| KR | 20100003557 A | 1/2010 | | |
| KR | 20120039469 A | 4/2012 | | |
| KR | 20140019961 A | 2/2014 | | |
| KR | 20140110444 A | 9/2014 | | |
| KR | 20140133569 A | 11/2014 | | |
| KR | 20150110983 A | 10/2015 | | |
| KR | 20170082019 A | 7/2017 | | |
| KR | 20180013554 A | 2/2018 | | |
| KR | 20190058196 A | 5/2019 | | |
| KR | 20200114385 A | 10/2020 | | |
| WO | WO/2013/133039 | * | 2/2013 | .............. H01M 2/02 |
| WO | WO2019203047 A1 | 1/2021 | | |
| WO | 2022124310 A1 | 6/2022 | | |

* cited by examiner

POUCH TYPE BATTERY CELL AND METHOD FOR MANUFACTURING THE SAME

CROSS-REFERENCE TO RELATED APPLICATIONS

This application claims the priority of Korean Patent Application No. 10-2022-0087829 filed on Jul. 15, 2022, in the Korean Intellectual Property Office, the disclosure of which is incorporated herein by reference.

BACKGROUND OF THE INVENTION

Field of the Invention

The present invention relates to a pouch type battery cell, in which an electrode assembly is accommodated between a pair of cases, each of which includes a first resin layer constituting the innermost layer, a second resin layer constituting the outermost layer, and a metal layer stacked between the first resin layer and the second resin layer, and a method for manufacturing the pouch type battery cell.

Description of the Related Art

Recently, secondary batteries have received attention as power sources for electric vehicles (EV), hybrid electric vehicles (HEV), and the like, which are proposed solutions to air pollution problems caused by existing gasoline vehicles, diesel vehicles, and the like.

While a small-sized mobile device uses one, or a few, secondary batteries, a medium to large-sized device such as an electric vehicle, uses a battery module, in which a plurality of secondary batteries are electrically connected to each other, or a battery pack, in which a plurality of battery modules are electrically connected to each other, thus generating the necessary high output and large capacity.

One of the secondary batteries that attracts the most interest among currently commercialized secondary batteries is the lithium secondary battery. Lithium secondary batteries may be classified according to the shape of their exterior material, for example, secondary batteries may be a can type, a prismatic type, a pouch type, and the like. Among these types, pouch type secondary batteries are widely used in medium to large-sized battery modules because of their high energy density and their ability to be easily stacked.

As the demand for high energy secondary battery modules in vehicles increases, so too has the demand for their safety. That is, when secondary batteries have high energy density, there is a stability risk (e.g., a risk of fires and explosions).

In general, a pouch type battery cell has a structure in which an electrode assembly is accommodated in a pouch type battery case and a sealing portion is provided on an edge of the battery case.

When the temperature of the battery exceeds a critical temperature due to abnormal heat generation or the like, the temperature may rapidly increase and thermal propagation (TP) to other surrounding battery cells may occur. Accordingly, a safety problem may occur. Thus, a sealing portion having higher thermal resistance and sealing strength is desired to prevent or sufficiently delay thermal propagation.

SUMMARY OF THE INVENTION

An aspect of the present invention provides a pouch type battery cell, in which a sealing portion has high thermal resistance and sealing strength, and a method for manufacturing the pouch type battery cell.

In a pouch type battery cell according to an embodiment of the present invention, an electrode assembly may be accommodated between a pair of cases, each of which includes a first resin layer constituting an innermost layer, a second resin layer constituting an outermost layer, and a metal layer stacked between the first resin layer and the second resin layer. The pouch type battery cell may include a cup portion, which is provided in at least one of the pair of cases and accommodates the electrode assembly, an insulation sealing portion, on which the first resin layers of the pair of cases are sealed to each other, a folded portion, in which an edge of one case of the pair of cases is folded to surround an edge of the other case, and a metal sealing portion, provided on the folded portion, in which the metal layers of the pair of cases are sealed to each other.

The metal sealing portion may be disposed outside the insulation sealing portion.

The metal sealing portion may include a first metal sealing portion, on which one surface of the metal layer of the other case is sealed to the metal layer of the one case, and a second metal sealing portion on which the other surface of the metal layer of the other case is sealed to the metal layer of the one case.

The first resin layer and the second resin layer may be excluded from the metal sealing portion.

The first resin layer may be excluded from the metal sealing portion, and the second resin layer may be excluded from at least one outward facing surface of the one case.

The metal layer may include a stainless-steel material.

A method for manufacturing a pouch type battery cell according to an embodiment of the present invention may include accommodating the electrode assembly in a cup portion formed in at least one of the pair of cases, sealing the first resin layers of the pair of cases to each other, forming a folded portion by folding an edge of one case of the pair of cases so that the edge surrounds an edge of the other case, and sealing the metal layers on the folded portion to each other.

The sealing of the first resin layers may include thermally fusing the first resin layers to each other, and the sealing of the metal layers may include welding the metal layers to each other using a laser.

The edge of each of the pair of cases may include an exposed region in which the first resin layer is excluded and an inner surface of the metal layer of the other case is exposed to an exposed region of the one case may surround the exposed region of the other case.

The folded portion may include a region from which the second resin layer is excluded, and sealing the metal layers may include emitting a laser onto the region from which the second resin layer is excluded.

In another embodiment, a pouch type battery cell is accommodated between a first case and a second case, each case having a first resin layer constituting an innermost layer, a second resin layer constituting an outermost layer, and a metal layer stacked between the first resin layer and the second resin layer. The pouch type battery cell may include: a cup portion provided in at least the first case or the second case and arranged to accommodate the electrode assembly, an insulation sealing portion in which the first resin layer of the first case is sealed to the first resin layer of the second, and a metal sealing portion including a first metal sealing portion and a second metal sealing portion.

The metal sealing portion may be provided outside the insulation sealing portion.

The first case and the second case may be integrally formed, and the pouch type battery cell may include a folding line between the first case and the second case.

Each of the first case and the second case may further include an edge surrounding the cup portion on three sides, and the insulation sealing portion and the metal sealing portion may be provided on each of the three sides.

The first case may be manufactured separately from the second case and subsequently joined to the second case, and each of the first case and the second case may further include an edge surrounding four sides of the cup portion, and the insulation sealing portion and the metal sealing portion may be provided on each of the four sides.

The pouch type battery cell may further include a folded portion in which an edge of the second case is folded to face an inward facing surface of an edge of the first case and an outward facing surface of the edge of the first case.

The first metal sealing portion may be provided at a location between the edge of the second case and outward facing surface of the edge of the first case, and the second metal sealing portion may be provided at a location between the edge of the second case and an inward facing surface of the first case.

The second resin layer may be excluded from at least a part the folded portion.

The second resin layer may be excluded from an entirety of the folded portion.

The metal layer may include a stainless-steel material.

BRIEF DESCRIPTION OF THE DRAWINGS

The following drawings attached in this specification illustrate a preferred embodiment of the present invention and function to make further understood the technical spirit of the present invention along with the detailed description of the invention. The present invention should not be construed as being limited to only the drawings. In the drawings.

DETAILED DESCRIPTION OF THE PREFERRED EMBODIMENT

Figure 1:
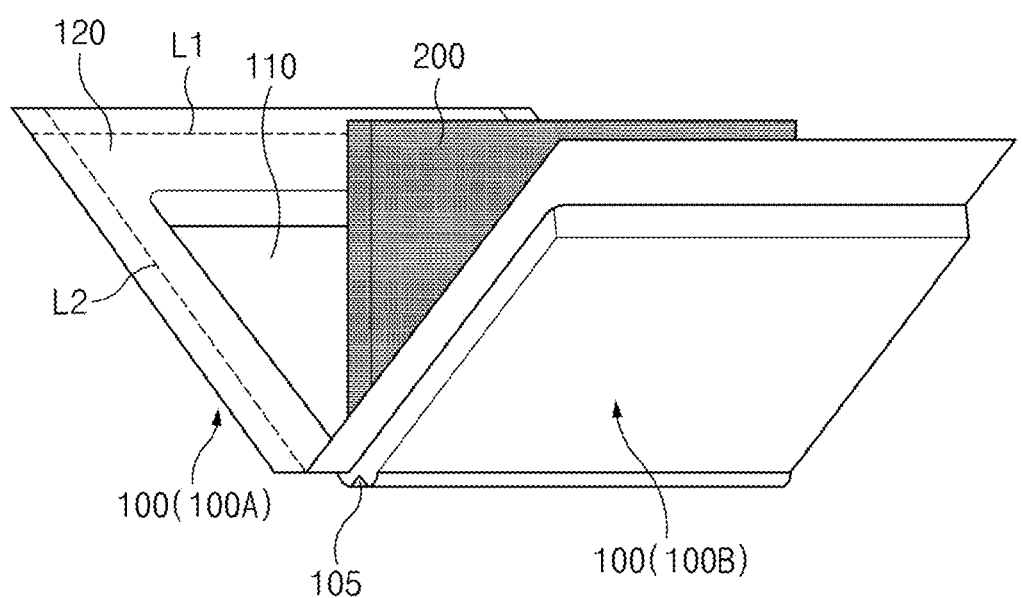
FIG. 1 is a perspective view illustrating a case and an electrode assembly of a pouch type battery cell according to an embodiment of the present invention.

Hereinafter, preferred embodiments of the present invention will be described in detail with reference to the accompanying drawings to enable those skilled in the art to which the present invention pertains to easily carry out the present invention. The present invention may, however, be embodied in different forms and should not be construed as limited by the embodiments set forth herein.

Details unrelated to the present invention, or details of related well-known art that may unnecessarily obscure the subject matter of the present invention, will not be discussed herein, in order to clearly describe the present invention without obstruction. Like reference numerals refer to like elements throughout the whole specification.

Figure 2:
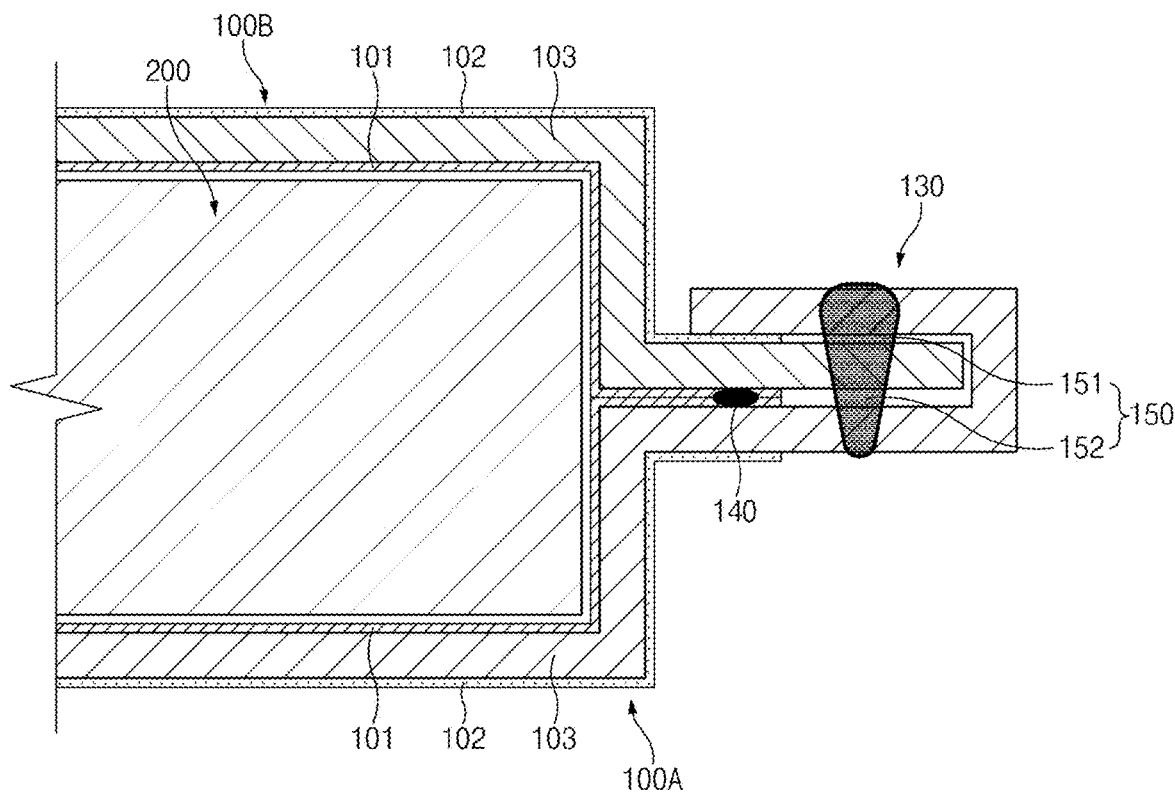
FIG. 2 is a cross-sectional view of a pouch type battery cell according to an embodiment of the present invention.

FIG. 1 is a perspective view illustrating a case and an electrode assembly of a pouch type battery cell according to an embodiment of the present invention. FIG. 2 is a cross-sectional view of a pouch type battery cell according to an embodiment of the present invention.

A pouch type battery cell 10 according to an embodiment of the present invention may include a pair of cases 100 for accommodating an electrode assembly 200. In more detail, the pair of cases 100 may include a cup portion 110 for accommodating the electrode assembly and an edge 120 surrounding the cup portion. The edge 120 of one case 100A may be sealed to the edge 120 of another case 100B to accommodate the electrode assembly 200 and an electrolyte therein, thereby forming the pouch type battery cell 10.

The electrode assembly 200 may include a positive electrode, a negative electrode, and a separator that is interposed between the positive electrode and the negative electrode to insulate the positive electrode and the negative electrode from each other. The type of the electrode assembly 200 is not limited. For example, the electrode assembly 200 may be a stacked-type electrode assembly in which a positive electrode and a negative electrode are stacked alternately with a separator therebetween. Alternatively, in another example, the electrode assembly 200 may be a jelly-roll-type electrode assembly in which sheet-shaped positive and negative electrodes are wound together with a separator therebetween.

The pair of cases 100 may be connected to each other at a folding part 105. That is, the pair of cases 100 may be integrally formed one body along the folding part 105. However, in other examples, the pair of cases 100 may be provided as separate components that are subsequently joined together.

With specific reference to FIG. 2, each of the cases 100 may include a first resin layer 101, a second resin layer 102, and a metal layer 103 interposed between the first and second resin layers. That is, the case 100 may be manufactured by molding a laminate film including the first resin layer 101, the second resin layer 102, and the metal layer 103.

The first resin layer 101 may constitute the innermost layer of the case 100. As a result, the first resin layer 101 disposed in the cup portion 110 of the case 100 may be in direct contact with, or adjacent to, the electrode assembly 200 and an electrolyte. Consequently, the first resin layer 101 may be formed from a material having high insulating properties and corrosion resistance. For example, the first resin layer 101 may include a polypropylene (PP) material. However, the present invention is not limited thereto, and the material of the first resin layer 101 may be appropriately selected by those skilled in the art.

The first resin layers 101 disposed on the edges 120 of the pair of cases 100 may be sealed together to provide an insulating sealing portion 140. The insulating sealing portion 140 will be described later in detail.

The second resin layer 102 may constitute the outermost layer of the case 100 and may electrically insulate the electrode assembly 200 while protecting the pouch type battery cell 10 from friction and collision with external items. As a result, the second resin layer 102 may be formed from a polyethylene terephthalate (PET) material. However, the present invention is not limited thereto, and the material of the second resin layer 102 may be appropriately selected by those skilled in the art.

The metal layer 103 may be stacked between the first resin layer 101 and the second resin layer 102. The metal layer 103 may secure the mechanical strength of the case 100, block entrance of external gas, moisture, or the like, and prevent leakage of the electrolyte.

In one example, the metal layer 103 may include a stainless steel (STS) material, which differs from conventional pouch type battery cells formed from aluminum (Al). Stainless steel has a melting point of about 1400° C., and thus, has a relatively higher thermal resistance compared to the aluminum (Al) based conventional pouch type battery cells.

The metal layers 103 disposed in the edges 120 of the pair of cases 100 may be sealed to each other to provide a metal sealing portion 150. The metal sealing portion 150 will be described later in detail.

The cup portion 110 that accommodates the electrode assembly 200 may be provided in at least one of the pair of cases 100. The cup portion 110 may be recessed and molded in the laminate film defining the base material of the case 100.

In one example, as shown in FIGS. 1 and 2, the cup portion 110 may be provided in both cases of the pair of cases 100. Put differently, the pair of cup portions 110 may communicate with each other to provide an accommodation space in which the electrode assembly 200 is accommodated.

Each of the pair of cases 100 may include edge 120 defining a terrace disposed around a circumference of the cup portion 110. The edges 120 of the pair of cases 100 may be sealed to each other to seal the electrode assembly 200 inside the pair of cases 100. When the pair of cases 100 are integrally formed as a single body, the folding part 105 may be folded so that the edges 120 of the pair of cases 100 are in contact with each other. In this case, the edges 120 that are in contact with each other may constitute three sides of the pouch type battery cell 10, and the folding part 105 may constitute the one remaining side. Thus, in the pouch type battery cell 10, sealing portions 140 and 150 may be provided at the three sides (e.g., each side except the one remaining side having the folding part 105).

In another example, when the pair of cases 100 are separately manufactured, the edges 120 of the pair of cases 100 may be subsequently placed in contact and sealed with each other to constitute the four sides of the pouch type battery cell 10. In this example of the pouch type battery cell 10, the sealing portions 140 and 150 may be provided at each of the four sides of the battery cell 10.

The pouch type battery cell 10 may optionally include a folded portion 130 at which the edge 120 of one case 100A is folded to surround the edge 120 of the other case 100B.

In more detail, the edge 120 of the one case 100A may be processed by hemming along an end of the edge 120 of the other case 100B. To this end, the edge 120 of the one case 100A may be wider than the edge 120 of the other case 100B. In more detail, the edge 120 of the one case 100A may be more elongated in a full-length and full-width directions relative to the edge 120 of the other case 100B.

A first line L1 and a second line L2 are illustrated in FIG. 1 as examples of lines to be folded in the hemming process. The first line L1 may be parallel to the full-length direction of the pouch type battery cell 10, and the second line L2 may be parallel to the full-width direction of the pouch type battery cell 10. Each of the first line L1 and the second line L2 may correspond to a terminal end of the edge 120 of the other case 100B.

The first line L1 and the second line L2 may be folded in either order. A corner portion at which the first line L1 and the second line L2 overlap each other at the edge 120 of the one case 100A may be double folded. However, the present invention is not limited thereto, and the corner portion may alternatively be cut out as appropriate determined by those skilled in the art.

Returning now to FIG. 2, the insulating sealing portion 140 and the metal sealing portion 150 of the pouch type battery cell 10 will now be described in further detail.

The insulating sealing portion 140 may be formed by sealing the first resin layers 101 of the pair of cases 100 to each other. In more detail, the first resin layer 101 of the edge 120 of the one case 100A may be thermally fused to the first resin layer 101 of the edge 120 of the other case 100B to form the insulating sealing portion 140.

The insulating sealing portion 140 may be provided completely within the folded portion 130, or alternatively, at least partially overlap folded portion 130 in a length direction of the battery cell 10.

The first resin layers 101 may be provided along the edge 120 of each of the pair of cases 100 adjacent to the cup portion 110. When the first resin layers 101 of the cup portion 110 are fused together, the insulating sealing portion is formed. Thus, the electrode assembly 200 and the electrolyte in the cup portion 110 may be sealed in an insulated state by the insulating sealing portion 140.

The metal layers 103 of each of the edges 120 of the pair cases 100 may extend beyond the first resin layers 101 and beyond the second resin layers 102 in the length and/or width direction of the battery cell 10. More particularly, the first resin layer 101 of the edge 120 may extend from the cup portion 110 toward, but not all the way to, the first line L1 in the width direction of the battery cell 10, and from the cup portion 110 toward, but not all the way to, the second line L2 in the length direction of the battery cell 10. Thus, the inner surface of the metal layer 103 of the edges 120 adjacent the ends of the edges are exposed (e.g., not covered by the first resin layer 101).

Similarly, the second resin layer 102 may only cover a part of the outside surface of the metal layer 103. More particularly, the second resin layer 102 from the cup portion 110 toward, but not all the way to, the first line L1 in the width direction of the battery cell 10, and from the cup portion 110 toward, but not all the way to, the second line L2 in the length direction of the battery cell 10. As a result, the outer surface of the metal layer 103 of the edges 120 adjacent the ends of the edges are exposed (e.g., not covered by the second resin layer 102). Consequently, as shown in FIG. 2, when the one case 100A is folded about the other 100B to create the folded portion 130, the exposed inner surface of the metal layer 103 of the one case 100A directly contacts both the exposed inner surface of metal layer 103 of the other case 100B (bottom surface of the other case 100B in FIG. 2) and the exposed outer surface of the metal layer 103 of the other case 100B (top surface of the other case 100B in FIG. 2).

The metal sealing portion 150 may be formed by sealing the metal layers 103 of the pair of cases 100 to each other. In more detail, the exposed metal layers 103 of the edges 120 of the pair of cases 100 may be welded to each other to provide the metal sealing portion 150, which may be disposed outside the insulating sealing portion 140.

When the metal layers 103 are welded directly to each other, the metal sealing portion 150 may have a higher sealing strength than the insulating sealing portion 140 in which the first resin layers 101 are fused to each other. Accordingly, the sealing strength of the pouch type battery cell 10 may be remarkably increased.

The metal sealing portion 150 may be provided on the folded portion 130. The metal sealing portion 150 may be formed by welding the exposed metal layers 103 of the folded portion 130, using a laser, thus creating a dual seal.

A laser beam for forming the metal sealing portion 150 may be emitted at one, or both sides, of the folded portion 130, however, the emitting direction is not limited. For example, the laser beam may be emitted from above or below the folded portion 130.

In more detail, the metal sealing portion 150 may include a first metal sealing portion 151, on which one surface (e.g., a top surface) of the metal layer 103 of the other case 100B is sealed to the metal layer 103 of the one case 100A, and a second metal sealing portion 152 on which the other surface (e.g., a bottom surface) of the metal layer 103 of the other case 100B is sealed to the metal layer 103 of the one case 100A.

When the metal sealing portion 150 is formed as a dual seal, the sealing strength of the pouch type battery cell 10 may be further increased. In addition, the exposed metal layers 103 advantageously creates a gap between the top surface of the metal layer 103 of the other case 100B and the metal layer 103 of the one case 100A, and between bottom surface of the metal layer 103 of the other case 100B and the metal layer of the one case 100A. As a result, the relative thickness of the folded portion 130 is reduced and the quality of the laser welding is improved.

Accordingly, the first resin layer 101 and the second resin layer 102 do not diminish the sealing quality and strength of the metal sealing portion 150.

Figure 3:
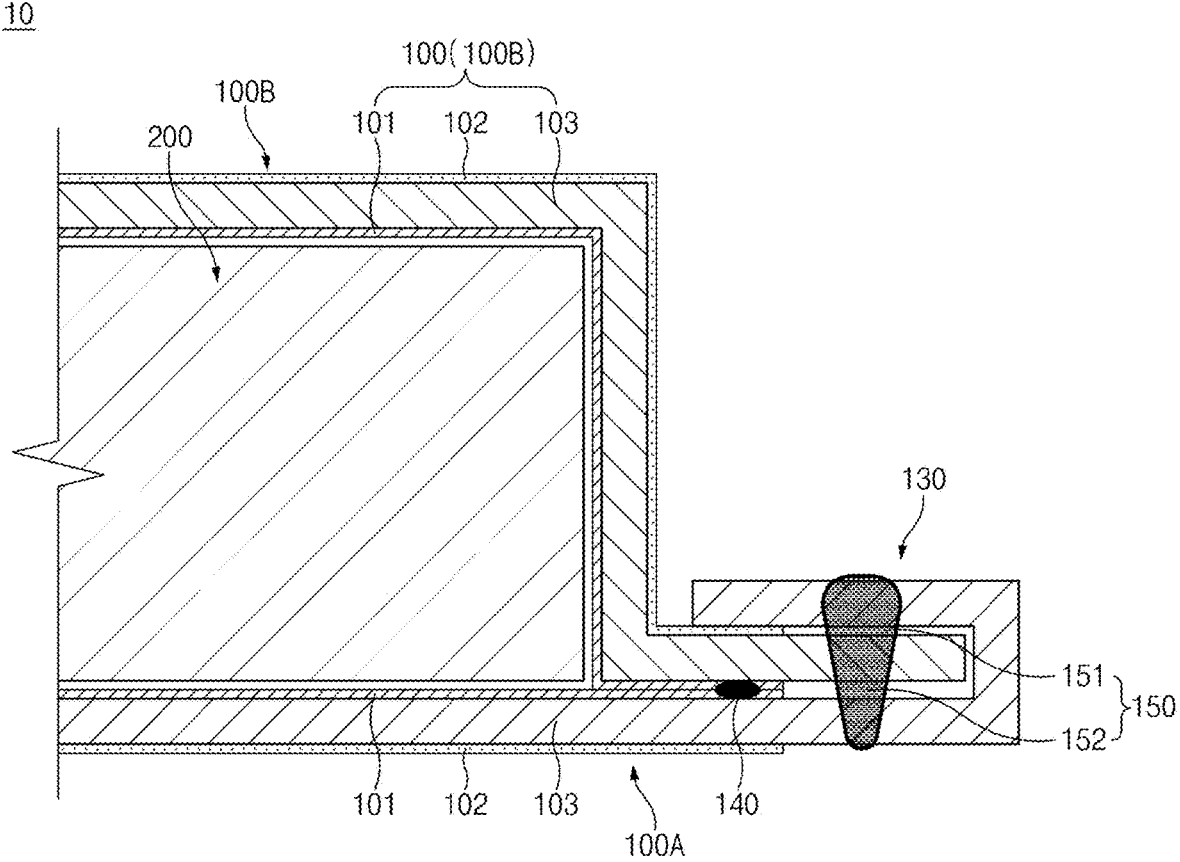
FIG. 3 is a cross-sectional view of a pouch type battery cell according to another embodiment of the present invention.

FIG. 3 is a cross-sectional view of a pouch type battery cell according to another embodiment of the present invention.

Hereinafter, the content duplicated with the embodiment described above will be omitted and the description will be focused on differences.

As shown in FIG. 3, a cup portion 110 may not be provided in one of the cases 100. For example, a cup portion may not be provided in the one case 100A, and the cup portion 110 may be provided in the other case 100B. The edge 120 of the one case 100A may be folded to surround the edge 120 of the other case 100B to form a folded portion 130. However, the present invention is not limited thereto, and the edge 120 of the other case 100B may be also folded to surround the edge 120 of the one case 100A to form the folded portion 130.

Like the embodiment described in FIGS. 1 and 2, the first resin layers 101 of the edges 120 of the pair of cases 100 may be thermally fused to each other to provide an insulating sealing portion 140, and the exposed metal layers 103 of the folded portion 130 may be welded to each other to provide a metal sealing portion 150. The content described above applies to sealing portions 140 and 150.

Figure 4:
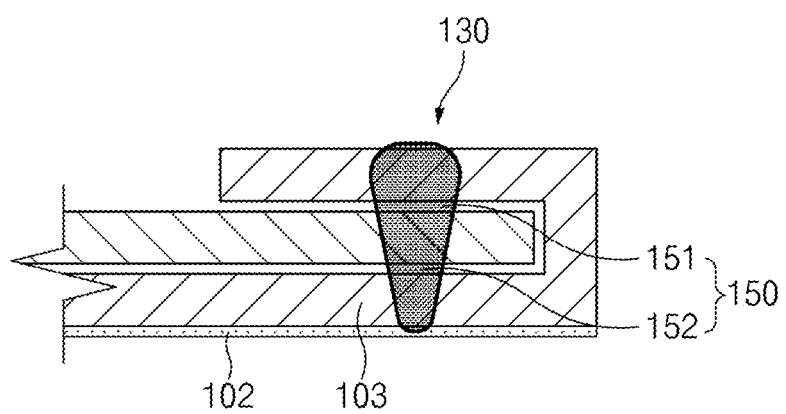
FIG. 4 is an enlarged cross-sectional view illustrating a folded portion of a pouch type battery cell according to still another embodiment of the present invention.

FIG. 4 is an enlarged cross-sectional view illustrating a folded portion of a pouch type battery cell according to still another embodiment of the present invention.

Hereinafter, the content duplicated with the embodiment described above will be omitted and the description will be focused on the differences.

As shown in FIG. 4, a second resin layer 102 may be excluded from any one or both outer surfaces of folded portion 130. Preferably, the second resin layer 102 may be excluded from the edge 120 of the other case 100B (e.g., not folded), and included in the edge 120 of the one case 100A (e.g., the folded case). That is, the second resin layer 102 may be excluded from both the surfaces of the one case 100A and the another case 100B (not shown) or excluded from the edge 120 of the other case 100B and included in the edge 120 of the one case 100A (FIG. 4). In either scenario, the exposed metal layers 103 of the one case 100A and the other case 100B are in directly contact and fused together to form the metal sealing portion 150 at the folded portion 130.

A laser beam for forming the metal sealing portion 150 may be emitted onto a surface of the folded portion 130, and preferably from onto the surface from which the second resin layer 102 is excluded from the folded portion 130. Accordingly, the metal layers 103 of the folded portion 130 may be welded directly to each other to form the metal sealing portion 150 without damaging the second resin layer 102.

Figure 5:
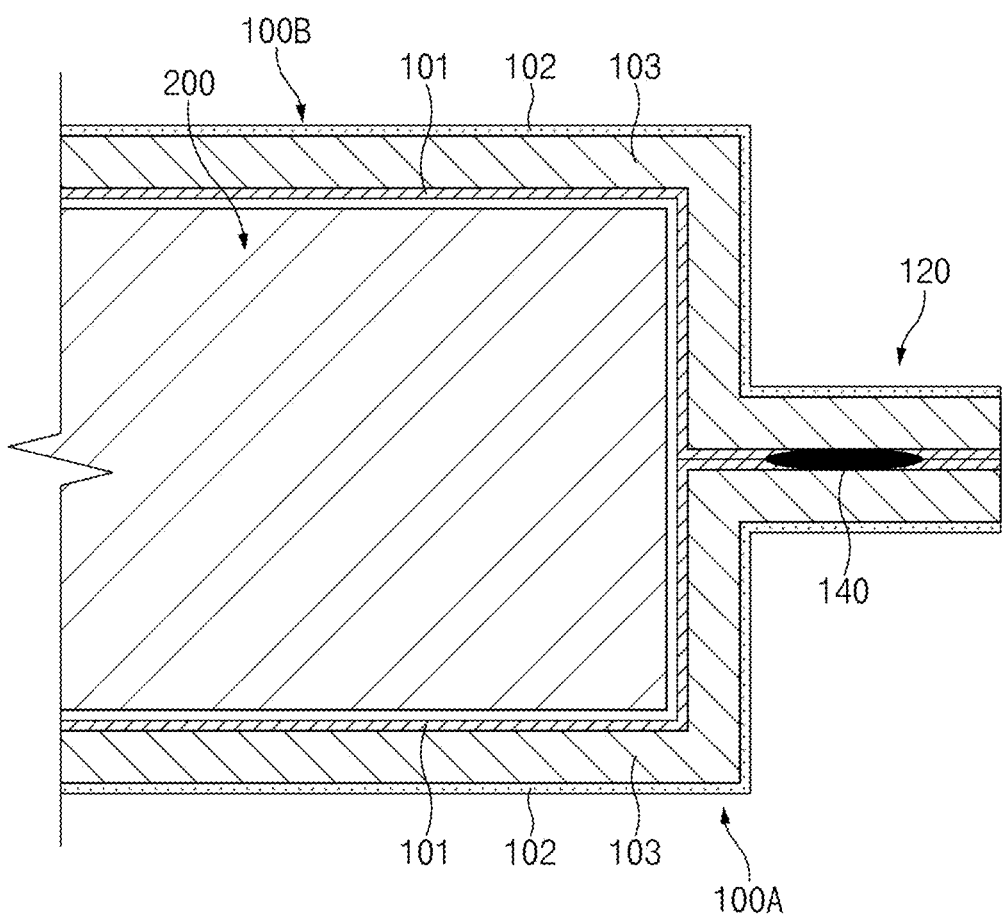
FIG. 5 is a cross-sectional view of a pouch type battery cell according to Comparative Example.

FIG. 5 is a cross-sectional view of a pouch type battery cell according to a Comparative Example.

A pouch type battery cell 10' according to the Comparative Example includes an insulating sealing portion 140, in which the first resin layers 101 of edges 120 of a pair of cases 100 are thermally fused to each other. Notably, the pouch type battery cell 10' does not include a metal sealing portion 150 in which exposed metal layers 103 are welded to each other.

Since the insulating sealing portion 140 is formed by thermally fusing the first resin layers 101 to each other, the insulating sealing portion 140 is weak when subjected to high-temperatures. For example, when the first resin layers 101 include a polypropylene (PP) material, the insulating sealing portion 140 may be melted at a temperature of about 150° C. Furthermore, when an electrode assembly 200, or the like, abnormally overheats, the internal temperature of a battery cell can rapidly increase to temperatures of about 1000° C. or higher. Accordingly, the sealing of the pouch type battery cell 10' may be destroyed.

On the other hand, in the pouch type battery cell 10 according to the present invention, the metal sealing portion 150 may be maintained at temperatures of about 1000° C., thus providing stability to the pouch type battery cell 10 even when the insulating sealing portion 140 is melted.

In particular, when the metal layer 103 constituting the metal sealing portion 150 includes a stainless steel (STS) material, the metal sealing portion 150 may not melt until a temperature of about 1400° C. is reached or exceeded. Accordingly, an occurrence of thermal propagation (TP) to other battery cells around the pouch type battery cell 10 may be prevented or sufficiently delayed.

Figure 6:
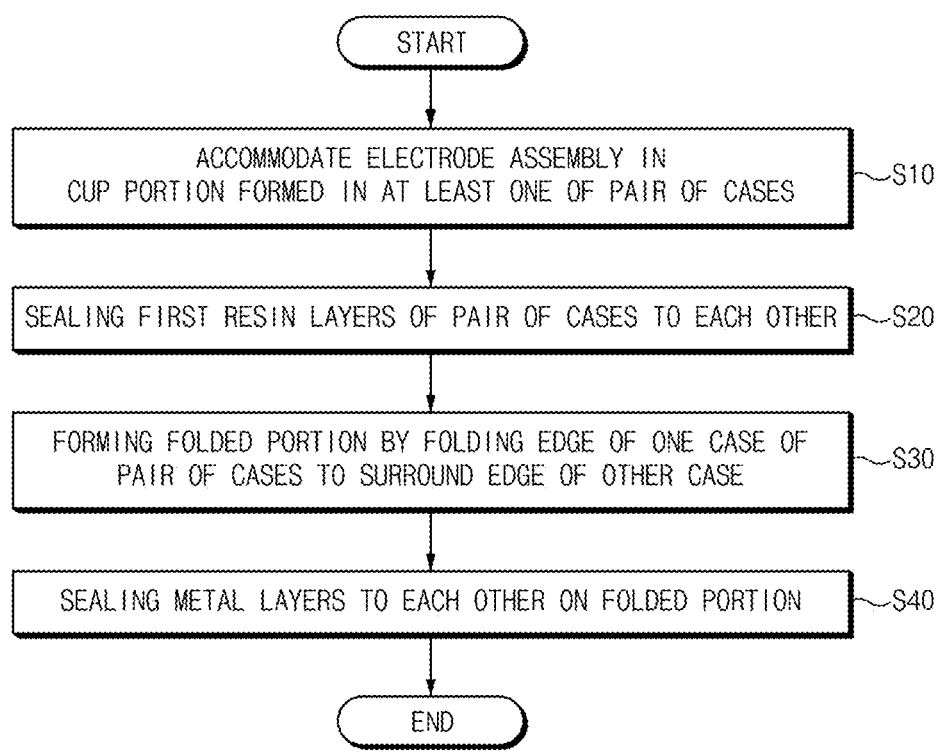
FIG. 6 is a flowchart of a method for manufacturing a pouch type battery cell according to still another embodiment of the present invention.

FIG. 6 is a flowchart of a method for manufacturing a pouch type battery cell, namely, type battery cell 10 described above.

The method for manufacturing the pouch type battery cell may include accommodating the electrode assembly 200 in the cup portion 110 formed in at least one of the pair of cases 100 (S10) (hereinafter referred to as an "accommodating process"), sealing the first resin layers 101 of the pair of cases 100 to each other (S20) (hereinafter referred to as an "insulation sealing process"), forming the folded portion 130 by folding an edge 120 of the one case 100A of the pair of cases 100 so that the edge 120 of the one case 100A surrounds the edge 120 of the other case 100B (S30) (hereinafter referred to as a "processing process"), and sealing the metal layers 103 of the folded portion 130 together (S40) (hereinafter referred to as a "metal sealing process").

In the accommodating process (S10), the edges 120 of the pair of cases 100 may be in contact with each other when the electrode assembly 200 is accommodated in the cup portion 110. Accordingly, the electrode assembly 200 may be accommodated between the pair of cases 100.

In the insulation sealing process (S20), the first resin layers 101 of the edges 120 of the pair of cases 100 may be thermally fused to each other to form the insulating sealing portion 140.

In the processing process (S30), the exposed region of the one case 100A may be folded to surround an exposed region of the other case 100B. Again, the exposed region means a region in which the first resin layer 101 is excluded from the edge 120 such that the inner surface of the metal layer 103 of the other case 100B is directly exposed to the metal layer 103 of the one case 100A. The exposed region may additionally, or alternatively, mean a region in which the second resin layer 102 is excluded from the edge 120 such that the outer surface of the metal layer 103 of the other case 100B is directly exposed to the metal layer 103 of the one case 100A.

When a corner portion of the edge 120 of the one case 100A is double folded, the processing process (S30) may also include a process of pressing the double-folded corner portion. Accordingly, the corner portion may be prevented from unnecessarily increasing in thickness.

In the metal sealing process (S40), the exposed metal layers 103 may be welded to each other using a laser to form the metal sealing portion 150. In more detail, the laser may be emitted onto one surface, or both surfaces, from which the second resin layer 102 is excluded.

The metal sealing portion 150 may include a first metal sealing portion 151, on which one surface (e.g., a top surface) of the exposed metal layer 103 of the other case 100B is sealed to the metal layer 103 of the one case 100A, and a second metal sealing portion 152 on which the other surface (e.g., a bottom surface) of the exposed metal layer 103 of the other case 100B is sealed to the metal layer 103 of the one case 100A.

The processing process (S30) and the metal sealing process (S40) may be performed in sequence. However, the order in which the insulation sealing process (S20) is performed may be changed as necessary. Furthermore, the processing process (S30) may be excluded entirely.

In one example, as illustrated in FIG. 6, the insulation sealing process (S20), the processing process (S30), and the metal sealing process (S40) may be performed in sequence.

In another example, the insulation sealing process (S20) may be performed after the processing process (S30) and the metal sealing process (S40).

In still another example, the insulation sealing process (S20) may be performed between the processing process (S30) and the metal sealing process (S40).

In a further example, the processing process (S30) may be omitted, and the insulation sealing process (S20) and the metal sealing process (S40) may be performed in sequence. Alternatively, the metal sealing process (S40) may be performed prior to the insulation sealing process (S20).

According to the preferred embodiments of the present invention, the metal sealing portion may be formed on the folded portion to maintain the sealing of the pouch type battery cell even at high temperatures and high pressure. Accordingly, when abnormally high-temperatures occur in the electrode assembly, the occurrence of the thermal propagation (TP) to other battery cells may be prevented or sufficiently delayed.

Moreover, the insulating sealing portion may be formed inside the metal sealing portion to insulate the electrode assembly and the electrolyte.

The metal sealing portion may be singly sealed dually sealed so that the sealing strength of the metal sealing portion is further increased.

When comparing battery cell 10 to conventional battery cell 10', the gap between the metal layers relative to the overall thickness of the edge may be decreased so that the quality of the laser welding is improved.

In addition, other effects may be included which are easily predictable by those skilled in the art from the configurations according to the preferred embodiments of the present invention.

The description of the present invention is intended to be illustrative, and various changes and modifications can be made by those of ordinary skill in the art to which the present invention pertains, without departing from the spirit and scope of the present invention as defined by the appended claims.

Therefore, the embodiments set forth herein are set forth to describe the technical spirit of the present invention and not to limit same. The scope of the technical spirit of the present invention is not limited by the embodiments.

Moreover, the protective scope of the present invention should be determined by reasonable interpretation of the appended claims and all technical concepts coming within the equivalency range of the present application should be interpreted to be in the scope of the present application.

What is claimed is:

1. A pouch battery cell, in which an electrode assembly is accommodated between a pair of cases, each of which comprises a first resin layer constituting an innermost layer, a second resin layer constituting an outermost layer, and a metal layer stacked between the first resin layer and the second resin layer, the pouch type battery cell comprising:
    a cup portion provided in at least one of the pair of cases and configured to accommodate the electrode assembly;
    an insulation sealing portion on which the first resin layers of the pair of cases are sealed to each other;
    a folded portion in which an edge of one case of the pair of cases is folded around a terminal end of an edge of the other case to surround the edge of the other case; and
    a metal sealing portion, provided on the folded portion, in which the metal layers of the pair of cases are sealed directly to each other.

2. The pouch type battery cell of claim 1, wherein the metal sealing portion is disposed outside the insulation sealing portion.

3. The pouch type battery cell of claim 1, wherein the metal sealing portion comprises:
    a first metal sealing portion on which one surface of the metal layer of the other case is sealed to the metal layer of the one case; and
    a second metal sealing portion on which the other surface of the metal layer of the other case is sealed to the metal layer of the one case.

4. The pouch type battery cell of claim 1, wherein the first resin layer and the second resin layer are excluded from the metal sealing portion.

5. The pouch type battery cell of claim 1, wherein the first resin layer is excluded from the metal sealing portion, and the second resin layer is excluded from at least one outward facing surface of the one case.

6. The pouch type battery cell of claim 1, wherein the metal layer comprises a stainless-steel material.

7. A method for manufacturing a pouch battery cell, in which an electrode assembly is accommodated between a pair of cases, each of which comprises an innermost first resin layer, an outermost second resin layer, and a metal layer stacked between the first resin layer and the second resin layer, the method comprising:
    accommodating the electrode assembly in a cup portion formed in at least one of the pair of cases;
    sealing the first resin layers of the pair of cases to each other;
    forming a folded portion by folding an edge of one case of the pair of cases around a terminal end of an edge of the other case to surround the edge of the other case; and
    sealing the metal layers of the one case and the other case on the folded portion directly to each other.

8. The method of claim 7, wherein, the sealing of the first resin layers includes thermally fusing the first resin layers to each other, and
    the sealing of the metal layers includes welding the metal layers to each other using a laser.

9. The method of claim 7, wherein the edge of each of the pair of cases comprises an exposed region in which the first resin layer is excluded and an inner surface of the metal layer of the other case is exposed to an exposed region of the one case.

10. The method of claim 7, wherein, the folded portion comprises a region from which the second resin layer is excluded, and the sealing the metal layers includes emitting a laser onto the region from which the second resin layer is excluded.

11. A pouch battery cell, in which an electrode assembly is accommodated between a first case and a second case, each case comprises a first resin layer constituting an innermost layer, a second resin layer constituting an outermost layer, and a metal layer stacked between the first resin layer and the second resin layer, the pouch type battery cell comprising:
    a cup portion provided in at least the first case or the second case and arranged to accommodate the electrode assembly;
    an insulation sealing portion in which the first resin layer of the first case is sealed to the first resin layer of the second case;
    a folded portion in which an edge of the second case is folded around a terminal end of an edge of the first case so that the edge of the second case faces one surface of the edge of the first case and an opposite facing surface of the edge of the first case; and
    a metal sealing portion including a first metal sealing portion directly sealing the metal layers of the edge of the second case and the one surface of the edge of the first case, and a second metal sealing portion directly sealing the metal layers of the edge of the second case and the opposite facing surface of the edge of the first case.

12. The pouch type battery cell of claim 11, wherein the metal sealing portion is provided outside the insulation sealing portion.

13. The pouch type battery cell of claim 11, wherein the first case and the second case are integrally formed, and the pouch type battery cell includes a folding line between the first case and the second case.

14. The pouch type battery cell of claim 13, wherein each of the first case and the second case further include an edge surrounding the cup portion on three sides, and the insulation sealing portion and the metal sealing portion are provided on each of the three sides.

15. The pouch type battery cell of claim 11, wherein the first case is manufactured separately from the second case and subsequently joined to the second case, and each of the first case and the second case further include an edge surrounding four sides of the cup portion, wherein the insulation sealing portion and the metal sealing portion are provided on each of the four sides.

16. The pouch type battery cell of claim 11, wherein the second resin layer is excluded from at least a part the folded portion.

17. The pouch type battery cell of claim 16, wherein the second resin layer is excluded from an entirety of the folded portion.

18. The pouch type battery cell of claim 11, wherein the metal layer comprises a stainless-steel material.

* * * * *